…

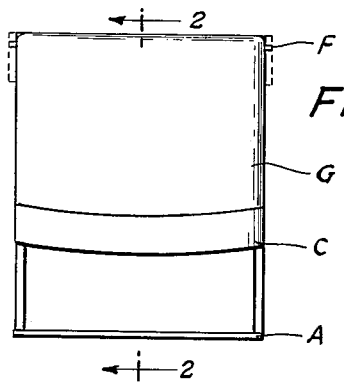
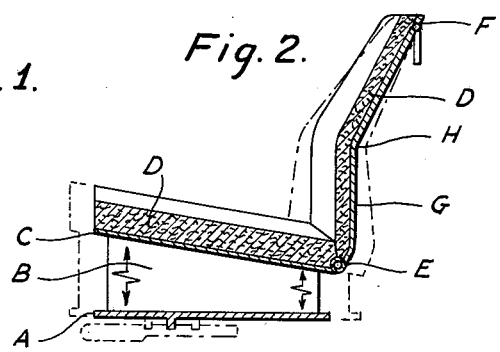
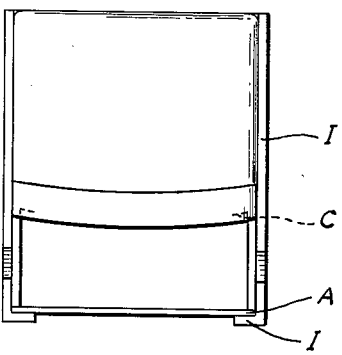
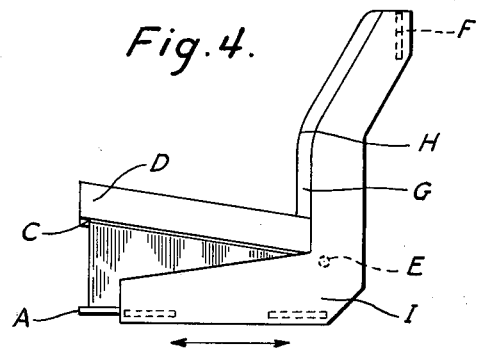
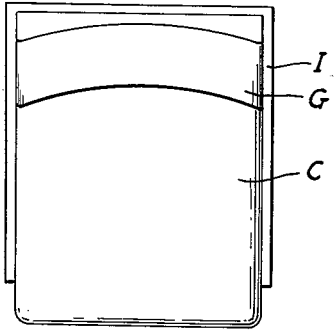
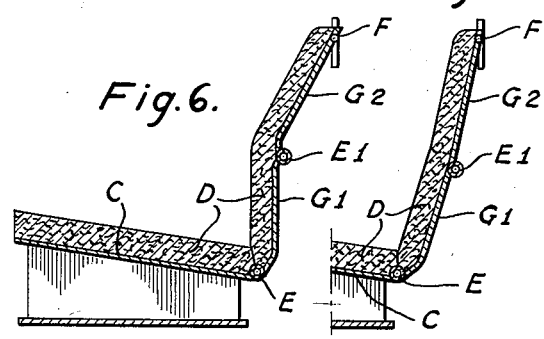

United States Patent Office 2,981,314
Patented Apr. 25, 1961

2,981,314

CAR SEATINGS AND CARS PROVIDED WITH SUCH SEATINGS

Gunnar Eklöf, Stockholm, and Bengt Valdemar Åkerblom, Malexander, Sweden, assignors to Aktiebolaget Akerblomstolen, Stockholm, Sweden Filed Aug. 25, 1958, Ser. No. 756,980

Claims priority, application Sweden Sept. 12, 1957

4 Claims. (Cl. 155—53)

The present invention relates to seating construction for cars and more particularly to a seating of this type having a seat bottom in relation to which the seat back is displaceable.

In the limited space inside a car the occupant of the seat cannot effect the desirable variations in seating comfort by properly adjusting the seat to accommodate his sitting posture.

The main object of the present invention is to render the posture of the occupant of a car seat more comfortable and more easily adjustable during the drive. A further object is to arrange the seat back displaceably to some extent so as to enable individually accommodated sitting postures and to facilitate adjustment of the occupant's sitting posture during the drive. According to one feature of the invention the bottom and back seat components of the seating construction are supported by a structural frame, if desired of the kind comprising an integral part of the body of the car, said bottom and back seat components being interconnected by articulation means located at the rear end of the seat bottom. In a manner known per se said bottom and back seat components may be provided with resilient coatings or covers facing the body of the occupant. Furthermore, viewed in vertical elevation, the seat back has a forwardly bent profile the peak of which is directed toward the lumbar-dorsal portion of the occupant, said peak being arranged adjustably in relation to the seat bottom. According to a preferred embodiment of the invention, said seat back, viewed in vertical section, has an angularly shaped profile, the apex of which is directed towards said lumbar-dorsal portion of the person seated, said apex being adjustable relatively to the seat proper.

According to the general principles of the invention for enabling appropriate design of seating constructions the main weight of the occupant's body in sitting posture is carried by the sitting nodes while the soft portions of the lower side of the thighs are released from uncomfortable compression. This implies that the posterior of the body is caused to rest upon a firm or rigid support by means of a thin resilient layer providing a nice and soft supporting surface below the sitting nodes, such layer preferably having a superficial texture such that its friction will prevent unintentional sliding of the occupant's body thereon. A firm or rigid construction affording resiliency in a springy or elastic surface layer only also is preferred for the seat back and its forwardly projecting lumbar support.

When mounting such a rather rigid seating construction in a vehicle, care should be taken to avoid that the movements of the vehicle do not cause a disturbing influence on the occupant. This necessitates that the complete seating construction, that is to say, its back and bottom, will operate as a unit, having a resiliency properly related to the movements of the vehicle and as far as possible to the weight of the occupant. In view of the shape of the seat back and its accentuated, projecting lumbar support it is necessary to connect the seat back to the seat bottom so that the former will follow the resilient motions of the latter in a vertical direction.

As regards the seating construction intended for the driver of the car, it is important for matter of security and from considerations of convenience when the car is swaying in turning curves, etc. that the seat back and the rear part of the seat bottom have a shape so as to encompass part of the body of the occupant to some extent. Of course, this condition is not as important for the other seats of the car, but the seat by the driver's side is preferably designed in a similar manner so as to prevent the passenger from being forced against the driver under swaying action.

As to a major extent maneuvering of the car is performed by the feet, it is highly desirable, in view of the varying lengths of the legs of different drivers, to arrange the driver's seat adjustably in the forward-rearward direction. A further advantage may be attained if the angle of inclination of the back of the driver's seat can also be adjusted by the driver. It is preferred to enable all adjustments of the driver's seating to be effected by the driver himself when seated in his driving position in the car.

Some embodiments of the invention will now be described more in detail by reference to the accompanying drawing, in which Fig. 1 shows a first embodiment of a seating construction according to the invention, viewed in front elevation;

Fig. 2 shows the seating construction of Fig. 1 in vertical section taken along the line 2—2 in Fig. 1;

Fig. 3 shows a second embodiment of a seating construction according to the invention in front elevation;

Fig. 4 shows the seating construction according to Fig. 3 in side elevation;

Fig. 5 shows a top plan view of the seating construction of Figs. 3 and 4;

Fig. 6 shows in vertical section a third embodiment of a seating construction according to the invention in one adjusted position, and Fig. 7 is a view of the seating construction of Fig. 6 in a second adjusted position.

Figs. 1 and 2 show a seating construction mounted in a car (not shown) and comprising a base frame or a base plate A the position of which can be adjusted by the driver in the forward-backward direction of the car. The base frame A functions as a supporting means for a resilient bumper means B suitably guided in vertical direction. A base plate C for the bottom seat consists of firm material. It is joined to the back plate G by hinges E which back plate is provided with a forwardly curved or convex projecting portion H acting as a lumbar support and having an accentuated angular bend. The top edge of the back plate G is suspended in a vertically disposed guiding arrangement F provided within a separate structural frame or in the body of the car. The base plate and the back plate are covered with a resilient coating or surface material D.

The car seat is adjustable by actuation from the driver or occupant in forward and backward direction. The inclination of the back G with respect to the seat bottom articulated thereto can be adjusted by simultaneously turning the back around the hinge E while the upper portion of the back is displaced in the vertical guiding arrangement F. The dashed lines in Fig. 2 illustrate some different portions of the bottom and back of the seat. The more forward the seat bottom is pushed, the greater is the inclination of the seat back and the more will be the angular displacement of the portion H of the back, serving as lumbar support in relation to the seat bottom. Thus this portion H will be retracted to some extent in relation to the seat bottom when the latter is pushed forward.

In Figs. 3 and 4 the displaceable car seat according to Fig. 2 is mounted in a frame I which can be fixed in forward and backward positions by means of separate operating means in known manner. This arrangement is particularly suitable for driver's seats or front seats generally, when it is desirable to adjust the position of the seating in the longitudinal direction even without simultaneously adjusting the inclination of the seat back. In this case, the forward and backward adjustment of the whole seat unit is effected by pushing the frame I including the seating enclosed therein to the desired position. Without displacing the frame I the position of the angular bend H of the seat back can be adjusted by displacing the seat bottom in the frame I.

Alternatively to changing the shape of the seat back by adjusting the seat bottom itself, the position or shape of the seat back can simply be adjusted for instance by arranging the seat back adjustably according to Figs. 6 and 7. In this case the seat bottom C may be mounted displaceably, but if desired also stationarily, and the seat back comprises at least two plates G1 and G2 which are hinged together by means of articulation means E1 in order to provide for adjustments of the vertical profile of the seat back. Preferably, also in this case the upper portion of the seat back is guided in suitable manner and the seat back can be locked in the desired position. Accordingly the seated person, when resting his back against the seat back G1, G2, with the angle bend H of the lumbar support being approximately situated at the articulation position E1, can adjust the position of said angle bend in relation to the seat bottom C by turning the plate G1 about the hinge E at the seat bottom while, simultaneously therewith, turning the plates G1 and G2 around their common hinge E1.

Fig. 7 shows that the seat back, may if desired, be temporarily given a concave profile.

By separate manually operated means the seat back may be locked in the adjusted position.

Having described the principles of the present invention in what are considered to be preferred embodiments, it is desired that it be understood that the specific details as to both the structure and procedure as set forth are merely illustrative and that the invention is not to be necessarily so limited. It is intended in the following claims to cover all such obvious modifications as fall within the true spirit and scope of the instant disclosure.

What we claim is:

1. A car seat comprising, a supporting frame structure, a seat back component, a seat bottom component, means for tiltably connecting said seat back component to the rear edge of said seat bottom component, means for slidably guiding said seat bottom component for horizontal movement in said frame structure in the longitudinal direction of the car, means for slidably guiding said frame structure for movement in the longitudinal direction of the car, substantially vertically extending guide means acting between the upper portion of said seat back component and said frame structure for directing the movement of said seat back with respect to said frame structure and means for supporting said bottom and back seat components in said frame structure by common resilient bumper means providing for joint movement of said bottom and back seat components up and down without alteration of their location relative to each other, said seat back component as viewed in vertical section being formed with a curved bent profile with the apex thereof directed toward the lumbar-dorsal portion of the occupant of the seat.

2. A car seat according to claim 1, wherein said seat back component is divided into two sections one above the other, said sections being connected together by articulation means at said apex, said articulation means permitting adjustment of the angle between said sections.

3. A car seat comprising a supporting frame structure, a seat back component and a seat bottom component, said seat back and bottom components being covered with resilient surface layers on the surfaces thereof facing the occupant, means for slidably guiding said seat bottom component for horizontal movement in said frame structure in the longitudinal direction of the car, means for slidably guiding said frame structure for movement in the longitudinal direction of the car, substantially vertically extending guide means acting between the upper portion of said seat back component and said frame structure for directing the movement of said upper part of said seat back in the direction of said guide means but allowing a tilting movement of said seat back component relative to said seat bottom component and means for supporting said seat bottom and back components in said frame structure by common resilient bumper means providing for joint movement of said seat bottom and back components up and down under the influence of the weight of the occupant, said bumper means having a compressibility, which is considerably greater than the compressibility of said surface layer covering said seat component, and said seat back component as viewed in vertical section being formed with a curved bent profile with the apex thereof directed toward the lumbar-dorsal portion of the occupant of the seat.

4. A car seat according to claim 3, wherein said seat back component is divided into two sections one above the other and the lower section at its lower edge being articulated to the rear edge of the bottom seat component while the upper section at its lower edge is connected by articulation means to the upper edge of said lower section, said articulation means permitting adjustment of the angle between said sections.

References Cited in the file of this patent

UNITED STATES PATENTS

| | | |
|---|---|---|
| 1,182,854 | Poler | May 9, 1916 |
| 1,516,811 | Edwards | Nov. 25, 1924 |
| 2,346,414 | Carpenter | Apr. 11, 1944 |
| 2,430,604 | Dorton | Nov. 11, 1947 |
| 2,466,345 | Wyeth | Apr. 5, 1949 |
| 2,560,688 | Dorton | July 17, 1951 |
| 2,611,420 | Diehl | Sept. 23, 1952 |
| 2,780,501 | Rosenberg | Feb. 5, 1957 |
| 2,795,265 | Albrech | June 11, 1957 |

FOREIGN PATENTS

| | | |
|---|---|---|
| 12,447 | Great Britain | 1902 |
| 1,034,827 | France | Apr. 15, 1953 |